United States Patent
Thompson et al.

(10) Patent No.: US 11,684,895 B2
(45) Date of Patent: Jun. 27, 2023

(54) BILAYER POLYAMIDE DESALINATION MEMBRANE

(71) Applicants: John F. Thompson, Deer Park, IL (US); Lars Kohler, Aurora, IL (US); Qun Song, Gurnee, IL (US); Jane C. Li, Arlington Heights, IL (US)

(72) Inventors: John F. Thompson, Deer Park, IL (US); Lars Kohler, Aurora, IL (US); Qun Song, Gurnee, IL (US); Jane C. Li, Arlington Heights, IL (US)

(73) Assignee: NL Chemical Technology, Inc., Mount Prospect, IL (US)

( * ) Notice: Subject to any disclaimer, the term of this patent is extended or adjusted under 35 U.S.C. 154(b) by 314 days.

(21) Appl. No.: 16/948,137

(22) Filed: Sep. 3, 2020

(65) Prior Publication Data

US 2022/0062830 A1    Mar. 3, 2022

(51) Int. Cl.
*B01D 69/12* (2006.01)
*B01D 61/02* (2006.01)
*C02F 1/44* (2023.01)
*B01D 71/56* (2006.01)
*C02F 103/08* (2006.01)

(52) U.S. Cl.
CPC ......... *B01D 69/125* (2013.01); *B01D 61/025* (2013.01); *B01D 71/56* (2013.01); *C02F 1/441* (2013.01); *C02F 2103/08* (2013.01)

(58) Field of Classification Search
CPC .... B01D 69/125; B01D 61/025; B01D 71/56; B01D 2323/40; B01D 67/0006; B01D 69/12; C02F 1/441; C02F 2103/08; Y02A 20/131
See application file for complete search history.

(56) References Cited

U.S. PATENT DOCUMENTS

| | | | |
|---|---|---|---|
| 4,005,012 A | 1/1977 | Wrasidlo | |
| 4,039,440 A | 8/1977 | Cadotte | |
| 4,277,344 A | 7/1981 | Cadotte | |
| 6,177,011 B1 | 1/2001 | Hatchisuka et al. | |
| 7,815,987 B2 | 10/2010 | Mickols et al. | |
| 8,196,754 B2 | 6/2012 | Ho et al. | |
| 8,646,616 B2 | 2/2014 | Mickols et al. | |
| 9,737,859 B2 | 8/2017 | Holmberg et al. | |
| 2021/0001282 A1* | 1/2021 | Shimura | B01D 67/0006 |

OTHER PUBLICATIONS

Aminoethylated acrylic polymers : PolyMent (product literature on www.shokubai.co.jp / products).
AD1039161 Final Report : Robust membranes for sustainable wastewater treatment by forward osmosis; May 2017; Menachem Elimelech at al.

* cited by examiner

*Primary Examiner* — Waqaas Ali
(74) *Attorney, Agent, or Firm* — Robert J. Petersen

(57) ABSTRACT

A composite reverse osmosis membrane having a semipermeable bilayer polyamide composition comprising a base layer containing a rigid crosslinked aromatic polyamide and a top layer containing a flexible aliphatic polyamide is disclosed, the two layers in combination providing reduced salt passage in reverse osmosis desalination of brackish waters and of seawater.

3 Claims, 2 Drawing Sheets

BILAYER POLYAMIDE DESALINATION MEMBRANE

FIELD OF THE INVENTION

This invention relates to reverse osmosis membranes for water treatment, and more particularly to improved composite reverse osmosis membranes for use in desalination.

BACKGROUND OF THE INVENTION

Seawater desalination by reverse osmosis requires membranes of high selectivity, so that potable water derived thereby meets World Health Organization (WHO) guidelines. Membranes capable of meeting WHO standards typically consist of ultrathin veneers of aromatic polyamides supported by finely microporous polysulfone layers, which in turn are backed by nonwoven webs. Methods of making such membranes have been previously disclosed in U.S. Pat. Nos. 4,277,344, 4,761,234, and 4,948,507 which patents are herein incorporated by reference in their entirety. Providers of such membranes are forever seeking to improve their membrane products in terms of salt rejection and productivity.

High performance composite membranes consist typically of at least three layers: a nonwoven carrier web, a microporous coating of an engineering plastic on one side of the carrier web, and an ultrathin aromatic polyamide deposited on the surface of the microporous plastic. Difficulties do occur in the manufacture and handling of high-performance membranes for seawater desalination. Starting chemicals may be contaminated or degraded. Nonwoven carrier webs may be variable in quality. The casting of microporous plastic may vary in response to temperature, humidity, molecular weight and quality of the incoming engineering plastic, web speed, web tension, and so forth. The ultrathin aromatic polyamide is formed by interfacial polymerization directly on the exposed surface of the microporous plastic coating, and this introduces other variables besides those just now named: temperature, humidity, purity of incoming chemicals, residence time in a reaction chamber, stability of the chemicals in solution, wetting effects by surfactants, generation of byproducts in the interfacial reaction, post-treatments such as washing, and so forth. Thus, the performance and quality of the membranes may periodically fall out of specification for reasons not understood or to combinations that affect the manufacturing process in unanticipated ways.

For instances wherein membrane salt rejections fall below desired levels, this disclosure reveals a new approach by which one may generate improved membranes. By this approach, superior salt rejections and selectivities may be restored, at least in part. It is an object of this invention therefore to provide a membrane product that retains superior salt rejection characteristics despite potential variability in membrane manufacturing operations.

It is a further object of this invention to provide membranes that exhibit improved salt rejection characteristics even when membrane manufacturing operations are sound and producing product that meets requirements in applications such as seawater desalination. This approach is applicable to composite membranes suitable to both brackish water and seawater treatment by reverse osmosis.

SUMMARY OF THE INVENTION

It has been found and is now disclosed that certain composite reverse osmosis membranes having bilayer polyamide compositions show high salt rejection and greatly reduced salt passage levels in reverse osmosis operations in comparison to customary monolayer polyamide compositions. Composite membranes made by this approach can achieve and have demonstrated up to a 60 percent reduction in salt passage through the membrane in desalination operations, such operations including desalting of brackish waters and of seawater. Thus, in accord with this approach, a rigid, crosslinked, aromatic polyamide serving as a base layer is overlaid by a second layer of a crosslinked aliphatic polyamide, the combination constituting a bilayer polyamide membrane that has superior salt rejection characteristics compared to the aromatic and the aliphatic polyamide layers taken individually as monolayers.

The aliphatic polyamide layer of this invention is preferably made from a polymeric aliphatic polyamine that has flexibility in its unreacted state, flexibility being defined by the polymeric aliphatic polyamine having a glass transition temperature (Tg) lower than 20 degrees Celsius. Polyacrylates that contain a plurality of pendant amino groups along the length of its polymeric backbone may be made that meet this desired characteristic.

In one embodiment of this invention, a thin-film-composite reverse osmosis membrane is provided that includes a bilayer polyamide having a base layer of an aromatic polyamide made by interfacial reaction of an aromatic polyamine with a polyacyl halide, the same having a second layer made by reaction of a polymeric aliphatic polyamine with a polyacyl halide, the second layer being bonded to the surface of the first layer.

In another embodiment of this invention, a thin-film-composite reverse osmosis membrane is provided that includes a bilayer polyamide having a base layer of an aromatic polyamide made by interfacial reaction of an aromatic polyamine with a polyacyl halide, the same having a second layer made by reaction of an aminoalkyl-substituted polyacrylate, an example being an aminoethylated polyacrylate, the second layer being formed in communication with an exposed surface of the aromatic polyamide base layer.

In yet another embodiment, a method of making a bilayer polyamide membrane is disclosed that includes the steps of impregnating a microporous support with an aqueous (i.e. water-based) solution of an aromatic polyamine, contacting the impregnated microporous support with a nonaqueous solution of a polyacyl halide to form an aromatic polyamide base layer, contacting the base layer with a solution of a polymeric aliphatic amine, and generating an aliphatic polyamide layer on the base layer by reaction of the aliphatic amine with acyl halide groups on the face of the base layer.

Important features of the disclosure have thus been summarized such that the detailed description that follows hereinafter may be more readily understood and appreciated. Additional details and experimental data will be described hereinafter that will form the subject matter of the claims that are appended to this disclosure.

LIST OF FIGURES

DESCRIPTION OF THE INVENTION

Figure 1:
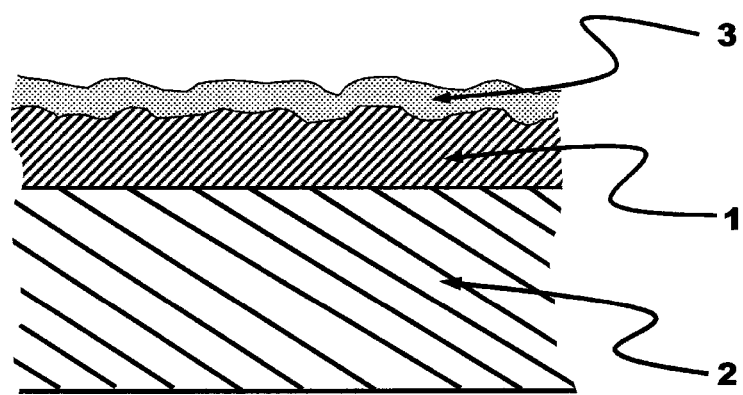
FIG. 1 is a schematic cross-section of a thin-film-composite membrane having a bilayer polyamide film.

Modern reverse osmosis membranes typically consist of a nonwoven polyester carrier web having a coating of a microporous layer of an engineering plastic (most commonly a polysulfone), upon which is formed an ultrathin layer of an aromatic polyamide comprising the reaction product of an aromatic polyamine such as metaphenylenediamine with an aromatic polyacyl halide such as 1,3,5-benzenetricarboxylic acid chloride (commonly referred to as trimesoyl chloride). The ultrathin polyamide layer is formed by interfacial polymerization between the aromatic polyamine and the aromatic polyacyl halide, the former being contained in an aqueous solution impregnated into the top surface of the microporous polysulfone, and the latter being contained in a nonaqueous solution brought into contact with the impregnated aqueous amine solution.

Membranes of this type are commonly referred to as composite membranes or as thin-film-composite membranes, the term "composite" referring to the multilayer construction of these membranes. The phrase "reverse osmosis" refers to the fact that the flow of water by osmosis through a membrane can be reversed if a solution in contact with the membrane is put under sufficient fluid pressure to reverse the phenomenon of osmosis. Water flux through a semipermeable film is higher when the film is thinner, and the composite construction of these membranes is designed to support very thin polyamide films even to feed water pressures as high as 1000 psi in desalination devices. The term "semipermeable" describes the fact that reverse osmosis membranes are permeable to water but nearly impermeable to most types of salts dissolved in water (particularly sodium chloride, sodium sulfate, calcium sulfate, magnesium chloride and the like).

The selectivity and salt rejecting performance of composite reverse osmosis membranes is dependent in great measure upon the composition and nature of the amine compound incorporated into the polyamide membrane layer. Aromatic polyamines such as metaphenylenediamine and 1,3,5-benzenetriamine are associated with composite membranes useful in seawater desalination. i.e. producing potable water from seawater by reverse osmosis. Aliphatic polyamines such as diethylenetriamine and triethylenetetramine are also associated with high salt rejections but at very low rate of water permeation (flux). Piperazine, a cyclic aliphatic diamine, is associated with high flux and high rejection of multivalent salts but low rejection of monovalent salts. The polyacyl halide employed in synthesizing these polyamide membranes is commonly trimesoyl chloride (benzene-1,3,5-tricarboxylic acid chloride), but blends of this polyacyl halide with isophthaloyl chloride or terephthaloyl chloride may also be employed. A cyclohexanetetracarboxylic acid chloride has also been shown to generate good polyamide membranes.

As seen above, the choice of the polyamine has a major effect in determining a membrane's resulting reverse osmosis performance, In this disclosure, polyamide layers based on aromatic polyamines such as metaphenylenediamine or its triamine analog are defined and will be referred to as aromatic polyamides, and polyamide layers based on aliphatic amine-modified polymers such as aminoalkylated acrylic polymers are defined and will be referred to as aliphatic polyam ides. The term "aromatic" is used in its chemical sense, indicating a benzene-ring-based moiety, and not to any kind of odor or aroma.

FIG. 1 is a drawing illustrating a schematic cross-sectional view of a bilayer polyamide reverse osmosis membrane. A base layer 1 of an aromatic polyamide is present as a deposit on a microporous support 2, which in turn is customarily supported on a nonwoven carrier web (not shown). A top layer of an aliphatic polyamide 3 is present as a deposit on the surface of the aromatic polyamide. The aromatic polyamide layer is shown as being nonuniform in thickness, which is generally true for nearly all presently available commercial desalination membranes. This nonuniformity is inherent in the formation of aromatic polyamide membranes by interfacial polymerization. The components in FIG. 1 are not drawn to scale; the aromatic polyamide layer 1 in practice is ultrathin, i.e. in the approximate range of 40 to 260 nanometers, while the microporous support layer 2 is typically in a thickness range roughly 100-fold thicker. In the present invention, the aliphatic polyamide layer 3 will generally be thinner than the aromatic polyamide upon which it rests as a top layer.

In the case of the presently disclosed invention, an aromatic polyamide reverse osmosis membrane is prepared as a base layer, which is then modified by a deposit of a polyamide of an aliphatic polyamine as a top layer. For purposes of this invention disclosure, preparation of the suitable base layer membranes may be fabricated within the general parameters as follows. An amine solution containing metaphenylenediamine at about 1 to 6 weight percent, preferably about 2 to 5 wt %, accompanied by a salt of camphor sulfonic acid at a concentration of about 1 to 8 wt %, preferably about 3 to 6 wt %, is impregnated into the surface of a web-supported layer of microporous polysulfone film. An acid acceptor such as sodium hydroxide is preferably included to maintain an aqueous amine solution pH in the range of 8-13, preferably 11-12.5. Small amounts of various organic solvents and/or additives may also be included in the aqueous amine solution for their beneficial effect on the interfacial formation of the membrane's discriminating layer. Some such additives may include surfactants, amine salts, isopropyl alcohol, dimethyl sulfoxide and dimethylformamide, individually or in combination. Regarding surfactants, anionic surfactants are preferred, examples including sodium dodecyl benzene sulfonate and sodium lauryl sulfate (sodium dodecyl sulfate). Useful surfactant concentrations in the aqueous amine solution are about 0.05 to 0.5 wt %, preferably about 0.2 to 0.3 wt %.

The aromatic amine-laden microporous support film is then contacted with a polyfunctional acyl halide or a blend of acyl halides, preferably trimesoyl chloride alone or in combination with isophthaloyl chloride, contained in a non-polar organic solvent or mixed non-polar organic solvents. The polyfunctional acyl halide is typically dissolved in the non-polar organic solvent in a range of 0.05 to 3 weight percent, preferably 0.1 to 0.3 wt %. Suitable non-polar organic solvents are those which are capable of dissolving polyfunctional acyl halides and which are immiscible with water. Preferred solvents are those that do not pose a threat to the ozone layer and are sufficiently safe in terms of their flashpoints and flammability to undergo routine processing without having to undertake extreme safety precautions. Higher boiling hydrocarbons, i.e., those with boiling points greater than about 90° C. such as C8-C14 hydrocarbons and mixtures thereof, are favored.

Once brought into contact with the aqueous polyamine solution coated on the microporous support, the polyfunctional acyl halide reacts with the polyamine at the water-solvent interface to form a crosslinked polyamide discriminating layer. The reaction time typically occurs within a few seconds but contact time is often from ten to sixty seconds to allow full development of a polyamide layer thickness, after which excess liquid is customarily removed by decanting, or by vacuum, or by an air knife, or by evaporation such as by passage through a circulating air oven or dryer, or by a combination of these techniques. The removal of the excess or residual organic solvent can be conveniently achieved in most cases by drying in an oven at elevated temperatures, e.g., from about 60° C. to as high as about 110° C., but preferably in the temperature range of about 80 to 90° C. The oven time sufficient to remove residual hydrocarbon solvent will depend upon temperature setting, on oven design, and on quantity of solvent still residing on the membrane product. Drying times on the order of 2 to 10 minutes are generally enough but may be shortened to a period of 2 to 8 minutes. Air drying at ambient temperatures may be used if especially desired in specific instances. This methodology will produce composite reverse osmosis membranes having utility in treating brackish water by reverse osmosis to provide purified water. With careful attention to web handling and the interfacial reaction steps and to purity of the incoming reactants, this base layer can have such superior reverse osmosis characteristics as to be useful in seawater desalination to produce potable water.

In the procedure of making the base layer of the polyamide composite membrane, an excess of polyacyl halide solution is utilized to enable full development of the interfacially formed aromatic polyamide. When the newly formed membrane is passed through an oven to remove the hydrocarbon solvent by evaporation, residual unreacted polyacyl halide remains on the surface of the base layer. This unreacted polyacyl halide (and presumably some partially reacted, surface bound, polyacyl halide) is available for use in forming the aliphatic polyamide top layer. The aliphatic polyamide layer may thus be formed by contacting the top surface of the aromatic polyamide layer with a solution of a polymeric aliphatic polyamine and fostering reaction of this polyamine with the residual polyacyl halide. Residual polyacyl halide reactants from the formation of the base layer are generally present in sufficient quantity to generate the corresponding aliphatic polyamide layer in place on the base layer. The top surface of the base layer may be further enriched with polyacyl halides by contact with a hydrocarbon solution of the polyacyl halides by means of sprays, curtain coaters, transfer rollers, or other methods of liquid transfer. Other amine-reactive reactants may be added to the surface of the base layer in this stage of the process, such reactants including isocyanates, aldehydes, and alkyl halides. However, polyacyl halide formulations and concentrations as presented above in making the base layer have been found to be generally sufficient in this step to make the aliphatic polyamide top layer.

Regarding polymeric aliphatic polyamines, polyacrylates with amine-containing side groups are quite suitable for use in this invention. Amine-rich derivatives of polyacrylates are conveniently prepared by reaction of ethylenimine with pendant carboxylic acid groups distributed along the polyacrylate chain. Propyleneimine and other amine compounds with similar reactivity toward carboxylic acid groups may be substituted in whole or in part for ethylenimine in forming polymeric aliphatic polyamines from polyacrylates. Carboxylic acid groups on a polyacrylate backbone may be generated by at least two routes: by co-polymerization in acrylate monomer mixtures or by hydrolysis of polyacrylate ester groups polymerized into polyacrylates. Combinations of these methods may be employed as well within the context of this invention.

By these routes, one may prepare a variety of aminoalkylated polyacrylates of the formula

wherein $R_1$ is a hydrogen or a methyl group, $R_2$ is an alkyl group having one to eight carbon atoms, X, Y and Z designate a plurality of the groups within the respective brackets, Z referring to aminoalkyl groups in a side chain, and n is ideally 2 but may be 3 or higher. When n equals 2, the polymeric aliphatic polyamine is an aminoethylated polyacrylate copolymer. When X is zero, the polymeric aliphatic polyamine is a homopolymer rather than a copolymer. The invention is not limited strictly to homopolymers or copolymers; terpolymers or higher may also serve as suitable forms of polymeric aliphatic polyamines in the invention. All these variations are intended to be included in the scope of the claims.

Regarding aminoethylated polyacrylate copolymer as an example, this particular form of polymeric aliphatic polyamine is conveniently made by reaction of the three-membered ring ethylenimine with free carboxylic groups that are present in a polyacrylate copolymer by design. This reaction generates a side chain of as high as ten aminoethyl units or more, with the length of these amine-rich side groups controllable by the starting ratio of ethylenimine to carboxylic acid groups in the starting polyacrylate polymer. A representative formula for this specific copolymer is given as

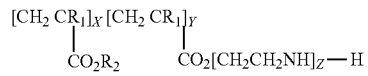

wherein $R_1$, $R_2$, X, Y, Z are as previously stated above. The side chain is hydrophilic and reactive toward any amine-reactive reagents. A small percentage of ethylenimine rings may possibly attach to amino groups in the sidechains to generate branching in the side chains. Any such branching is not meant to be excluded by the above formula. Ester groups shown as $COOR_2$ groups in the formula can be modified to have alkyl groups of various lengths, by which the solubility of the resulting acrylate copolymer can be controlled and fashioned for specific applications. Small alkyl groups such as methyl and ethyl groups make the aminoethylated acrylate copolymer more amenable to solution in aqueous media. Large alkyl groups, on the other hand, promote solubility in nonaqueous solvents, including hydrocarbon solvents such as employed in interfacial polyamide formation.

Certain aminoethylated acrylate copolymers are manufactured by Nippon Shokubai and are commercially available in the United States through Sumitomo Corporation of the Americas under the trade name Polyment. The term "copolymer" in this case is meant to indicate that the amine-containing polyacrylate consists of two or more monomers incorporated into the polymer, at least one monomer being an alkyl acrylate repeating unit and at least one monomer being an acrylic acid repeating unit. In practice, the acrylate copolymer is produced by a chemical polymerization reaction followed subsequently by reaction of the copolymer with ethylenimine to produce the aminoethylated acrylate copolymer.

Solutions of aminoethylated acrylate copolymers may be made by dissolving the acrylate copolymers in either an organic solvent or in water. Water-soluble grades are preferably stabilized in solution by partial neutralization of the amine-containing side chain with an acid such as hydrogen chloride or hydrogen bromide. Other acidic species may be used in place of these acids. Solutions in nonaqueous solvents are readily formed, but may be augmented by use of co-solvents, for instance by using isopropyl alcohol as a solubilizing agent in a toluene solution.

Figure 2:
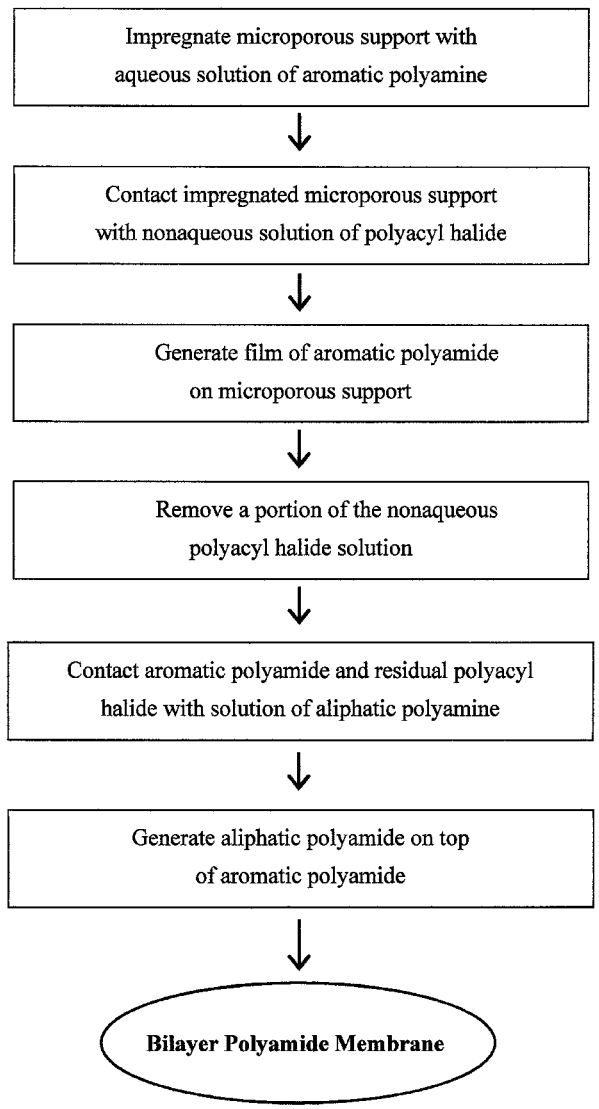
FIG. 2 is a flow chart showing the method steps involved in making a bilayer polyamide membrane.

FIG. 2 is a flow chart showing a method by which bilayer polyamide membranes may be prepared in accordance with this invention disclosure. The sequential steps to making bilayer polyamide membranes in accord with this invention include impregnating a microporous support with a solution of an aromatic polyamine such as metaphenylenediamine or 1,3,5-benzenetriamine, and then contacting the impregnated support with a nonaqueous solution of polyacyl halide such as trimesoyl chloride in a hydrocarbon solvent whereby interfacial reaction generates an aromatic polyamide on the surface of the microporous support. A portion of the nonaqueous solvent along with residual unreacted polyacyl halide contained therein is removed, followed by contacting the aromatic polyamide layer with a solution of an aliphatic polyamine, thereby forming an aliphatic polyamide on the surface of the aromatic polyamide, the polyamide forming by reaction of the aliphatic polyamine with residual polyacyl halide in solution and with incompletely reacted acyl halide groups on the aromatic polyamide surface.

Under ideal manufacturing conditions, aromatic polyamides made by the procedure described earlier above can exhibit salt rejections of 99.5% and higher when contacted with seawater under reverse osmosis operating conditions. But at times, often for reasons not understood, salt rejection values will be less than desired, dropping to the level of 99.0% or lower. In either case, formation of an aliphatic polyamide layer on the top of the aromatic base layer provides membranes with improved salt rejection and selectivities.

Although this invention is not to be governed or limited by the following theory, it is surmised that, because of the wide variation in the thickness and surface contour of the base membrane, certain microscopic regions of the base membrane may consist of incompletely formed aromatic polyamide barrier layer, Such regions thus allow high flux and poor or substandard rejection of water-borne salts. Alternatively, point stresses may develop in the base layer such that microscopic tears or leaks open and allow leakage of brackish water or seawater during reverse osmosis operation. A top layer having flexibility would allow polymeric chains to orient to the leakage sites to slow down or plug this leakage. This scenario is hypothetical; nevertheless, the actual combination of a top layer of a flexible aliphatic polyamide on a crosslinked aromatic polyamide base layer shows significant improvement when the base layer itself shows less than desired salt rejection. Even when the base membrane exhibits high salt rejections, however, the aliphatic polyamide layer has resulted in some improvement in salt rejections by the corresponding bilayer membrane, which goes beyond the plausible explanation of this suggested theory.

A flexible aliphatic polyamine suitable for the top layer may be characterized as being a flexible polymeric species having amine groups distributed along its length, the aminated polymer preferably having a glass transition temperature lower than 20° C. Particularly useful in this regard are aminated derivatives of acrylate polymers due in part to their flexibility, which is supported by the low glass transition temperatures (Tg) associated with the flexible polyacrylate backbone. As a class, polyacrylates are characterized as soft, tough, and rubbery, having Tg values often far below room temperature.

The following provides a description of experimental use of an aminoethylated acrylate copolymer as an example whereby one may practice the approach of this disclosure and the positive benefit one may derive thereby. A base membrane was prepared according to the parameters laid out earlier in this disclosure, and it is referred to below as Base Membrane 1. After formation of the base polyamide layer and passage of the base layer through an oven to remove the hydrocarbon solvent, a portion of this membrane was modified by formation of a top layer of an aliphatic polyamide through reaction of an aminoethylated acrylate copolymer (AEAC) with trimesoyl chloride directly on the face of the base membrane. A water-soluble grade of the polyacrylate designated as NK200PM made by Nippon Shokubai Co. Ltd, and consisting of nominally 56% polymer solids, 33% propylene glycol mono-methyl ether and the rest water, was used in forming the top layer. This aminoethylated acrylate copolymer is listed as having a molecular weight in the range of 10,000 to 30,000 Daltons, a Tg of 16° C., and an amine value of 2.2 to 2.9 mmol/g-solid. It was diluted with water to a solids concentration of 0.75 wt %. The top surface of the base membrane was contacted with this aqueous polyacrylate solution whereupon reaction with acyl halide groups resident on the surface of the base membrane reacted with the acrylate copolymer, thus generating the aliphatic polyamide layer. The treated membrane was then dipped in a glycerol solution of about 5 wt %, followed by drying in an oven at 80 to 90° C. The base membrane and the modified (bilayer) membrane were tested for performance characteristics in a standard brackish water test (see Table 1) and in a seawater desalination test (see Table 2).

TABLE 1

Brackish water test results (2,000 ppm NaCl, 225 psi).

| Example | Flux (gfd) | Salt Rejection (%) | Salt in Permeate (ppm) | Salt Passage (mg/ft$^2$-day) |
|---|---|---|---|---|
| Base Membrane 1 | 42.4 | 99.6 | 7.5 | 1204 |
| Base 1 + AEAC bilayer polyamide | 33.5 | 99.8 | 4.2 | 533 |

The results showed that under the brackish water test conditions, the salt rejection was improved by 0.2% with AEAC polyamide top layer, corresponding to a 56% reduction in salt passage.

TABLE 2

Seawater test results (32,000 ppm NaCl, 800 psi).

| Example | Flux (gfd) | Salt Rejection (%) | Salt in Permeate (ppm) | Salt Passage (mg/ft$^2$-day) |
|---|---|---|---|---|
| Base Membrane 1 | 48.8 | 99.3 | 214 | 39532 |
| Base 1 + AEAC bilayer polyamide | 44.9 | 99.6 | 133 | 22605 |

Evaluation of membrane performance in seawater desalination is done using a 3.2% solution of sodium chloride in water. Actual seawater concentration is 3.5% but includes various salts and ions other than sodium chloride. A 3.2% (32,000 ppm) solution of sodium chloride is iso-osmotic with standard seawater, hence its use in membrane testing. Under the seawater test conditions, the base membrane (having a monolayer of an aromatic polyamide made from reaction of meta-phenylenediamine with trimesoyl chloride) exhibited a salt rejection of 99.3%. The salt rejection was improved by 0.3% with AEAC polyamide top layer, corresponding to a 43% reduction in salt passage. From the viewpoint of taste and potability, a 43% reduction of salt content in the reverse osmosis membrane permeate is significant.

A membrane was made as described in Base Membrane 1, except that before the hydrocarbon evaporation oven, the membrane was passed under an air knife (AK) to remove a portion of the excess hydrocarbon solution with its attendant polyacyl halide content. The effect of the air knife treatment potentially leads to less polyacyl halide (trimesoyl chloride) residual content on the exposed surface of the aromatic polyamide base membrane and thereby a somewhat thinner layer of the aliphatic polyamide. After rinsing and final drying, the resulting membrane was tested under standard brackish water conditions (see Table 3) and seawater conditions (see Table 4).

TABLE 3

Brackish water test results (2,000 ppm NaCl, 225 psi).

| Example | Flux (gfd) | Salt Rejection (%) | Salt in Permeate (ppm) | Salt Passage (mg/ft²-day) |
|---|---|---|---|---|
| Base Membrane 2 (AK) | 54.3 | 99.5 | 10.0 | 2055 |
| Base 2 (AK) + AEAC bilayer polyamide | 38.9 | 99.7 | 6.9 | 1016 |

The results showed that under the brackish water test conditions, the salt rejection was again improved by 0.2% with AEAC polyamide top layer, corresponding to a 50% reduction hi salt passage.

TABLE 4

Seawater test results (32,000 ppm NaCl, 800 psi).

| Example | Flux (gfd) | Salt Rejection (%) | Salt in Permeate (ppm) | Salt Passage (mg/ft²-day) |
|---|---|---|---|---|
| Base Membrane 2 (AK) | 56.3 | 99.1 | 282 | 60099 |
| Base 2 (AK) + AEAC bilayer polyamide | 49.3 | 99.4 | 195 | 36391 |

Under the seawater test conditions, the salt rejection was again improved by 0.3% with AEAC polyamide top layer, corresponding to a 39% decrease in salt passage. In summary, the data indicate that the AEAC-polyamide-modified membrane showed higher salt rejection during the seawater test compared to the reference base membrane sample, both with and without the air knife operational step.

A high salt rejection reverse osmosis reference membrane was made as described before except that the membrane was formed with a meta-phenylenediamine solution at the high end of the range of amine concentration. The aromatic amine-laden coated microporous support film was then contacted with trimesoyl chloride dissolved in a range of 0.2 to 0.3 weight percent in a hydrocarbon solution. After rinsing and final drying, the resulting membrane was tested under standard seawater test conditions and exhibited a salt rejection of 99.80% (see Table 5). Under the seawater test conditions, the salt rejection was improved by 0.08% with AEAC polyamide top layer, corresponding to a 63% decrease in salt passage for this example.

TABLE 5

Seawater test results (32,000 ppm NaCl, 800 psi).

| Example | Flux (gfd) | Salt Rejection (%) | Salt in Permeate (ppm) | Salt Passage (mg/ft²-day) |
|---|---|---|---|---|
| Base Membrane 3 | 27.9 | 99.80 | 65.1 | 6875 |
| Base 3 + AEAC bilayer polyamide | 18.3 | 99.88 | 36.8 | 2549 |

The above examples and test data illustrate the beneficial nature of the bilayer polyamide composite membranes in effectively achieving reductions in salt in reverse osmosis membrane operations. They provide an approach that may advantageously be used when membrane manufacturing conditions generate composite membranes of monolayer polyamide design that fail to achieve required salt rejection criteria due to unfavorable manufacturing conditions. But they also provide an approach to improved salt rejections even when manufacturing conditions generate membrane products within desired specifications. With respect to the above description, it should be realized that variations in the polyamines, their concentrations, reaction times, other processing conditions, and especially choice of flexible aliphatic amine reactants such as for instance those with polyacrylate backbones will be apparent to one skilled in the art, and the figures and description are intended to be encompassed by the embodiments of the disclosure.

Therefore, the foregoing is considered illustrative only of the principles of the disclosure. Further, since numerous modifications and changes will readily occur to those skilled in the art, it is not the intention of the disclosure to limit the theme and scope of the invention in an unduly restrictive and narrow sense, but rather in accord with the full breadth of the claims as appended.

The invention claimed is:

1. A composite reverse osmosis membrane having a semipermeable bilayer polyamide composition comprising a base layer containing an aromatic polyamine-based polyamide and a top layer containing an aliphatic polyamine-based polyamide, wherein the aliphatic polyamine comprises an aminoalkylated polyacrylate of the formula

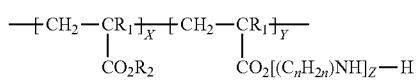

wherein $R_1$ is a hydrogen or a methyl group, $R_2$ is an alkyl group having one to eight carbon atoms, X, Y and Z designate a plurality of the groups within the respective brackets, Z referring to aminoalkyl groups in a side chain, and $n \geq 2$.

2. The membrane of claim 1 wherein the aliphatic polyamine comprises a polymeric compound having a glass transition temperature (Tg) of less than 20° C.

3. The membrane of claim 1 wherein the aliphatic polyamine comprises an aminoethylated acrylate copolymer.

* * * * *